United States Patent [19]

Kress

[11] 4,163,337
[45] Aug. 7, 1979

[54] FISHING LURE

[76] Inventor: James H. Kress, 580 Harwood Ave., Satellite Beach, Fla. 32937

[21] Appl. No.: 845,357

[22] Filed: Oct. 25, 1977

[51] Int. Cl.² ............................................. A01K 85/00
[52] U.S. Cl. .................................. 43/42.05; 43/42.25; 43/42.36
[58] Field of Search ................. 43/42.05, 42.04, 42.08, 43/42.25, 42.28, 42.36

[56] References Cited

U.S. PATENT DOCUMENTS

| | | | |
|---|---|---|---|
| 2,617,226 | 11/1952 | Yoshii | 43/42.05 X |
| 2,625,767 | 1/1953 | Pokras | 43/42.05 |
| 2,734,302 | 2/1956 | Wright | 43/42.05 |
| 3,169,336 | 2/1965 | Pope | 43/42.28 |
| 3,867,781 | 2/1975 | Wolfe | 43/42.05 |
| 3,914,895 | 10/1975 | Mize | 43/42.05 |

Primary Examiner—Nicholas P. Godici
Attorney, Agent, or Firm—Richard D. Dixon

[57] ABSTRACT

A fishing lure of the type coupled to a fishing line and the shank section of a barbed fishing hook. The fishing lure includes an elongated housing which defines therein a housing void for receiving the shank section of the fishing hook. A small bore communicates through the front end of the housing into the housing void for allowing the fishing line to pass therethrough, thereby allowing the housing to move in a forward direction along the fishing line away from the fishing hook after the barbed fishing hook has been struck by a fish.

11 Claims, 6 Drawing Figures

FISHING LURE

BACKGROUND OF THE INVENTION

I. FIELD OF THE INVENTION

This invention relates generally to fishing lures and more specifically to fishing lures known as "JIGS" which may employ a double skirt design.

II. DESCRIPTION OF THE PRIOR ART

Fishing lures commonly known as "JIGS" are well known in the prior art. The jig-type fishing lures are characterized as having a lead head and a flexible tail or skirt attached thereto. These jig-type fishing lures are known in the prior art to suffer from two basic deficiencies. First, the tying or otherwise affixing of the skirt material to the outside of the head or housing of the fishing lure has not been adequately secure and the skirts are sometimes lost. Secondly, the wrappings or other material used to cover and secure the skirt to the housing have greatly distracted from the realism of the lure, thereby causing a concomitant reduction in the effectiveness of the artificial lure.

The majority of fish strikes which occur with this type of lure are "head-strikes" because of the tendency of the fish to attack that portion of the lure which shines or reflects incident light. When using prior art designs for this type of fishing lure a large percentage of these head strikes result in lost catches because the hook barb generally extends several inches behind the lure head. As the fish strikes the forward end of the lure, the barbed hook is not properly engaged in the mouth of the fish.

Small jig-type lures partially overcome this deficiency by having the head molded around the shank of the hook. This type of construction cannot be employed when fishing for the larger species of fish. The weight of the head section of the lure must be permitted to slide away from the hook on the leader as the fish strikes the barbed hook. If the head section is not free to slide away from the hook, the additional mass of the head section will assist in tearing the hook from the mouth of the fish as it jumps and thrashes in an effort to remove the hook.

The present invention also includes an improved structure for attaching the double skirt to the body of the lure. In this manner the hair or skin-like material forming the skirt is attached to the housing of the lure so as to longitudinally separate the two ends of the skirt and clamp them firmly into an extended posture at the forward point of attachment. This technique presents a fuller, more life-like appearance and produces more skirt undulation or tail weaving action when the lure is pulled through the water.

Therefore, the first object of the present invention is to provide a structure which allows the shank end of the barbed hook to be accommodated within the head of the fishing lure to reduce head-strike losses.

A second object of the present invention is to provide an improved method of lure assembly which provides additional clamping action for securing the skirt material while further improving the overall realism and therefore the effectiveness of the lure.

SUMMARY OF THE INVENTION

This invention relates to a fishing lure of the type coupled to a fishing line and the shank section of a barbed fishing hook. The fishing lure comprises an elongated housing having a front end and a rear end. The housing defines therein an elongated housing void which defines a housing aperature adjacent the rear end of the housing for receiving therein the shank section of the fishing hook. The housing further defines a housing bore communicating through the housing from the housing void to open adjacent to the front end of the housing for movably receiving the fishing line therethrough. In this manner the shank section of the fishing hook will movably communicate within the housing void until a fish takes the hook at which time the housing is free to slide away from the fishing hook in order to reduce the effective mass of the fishing hook.

DESCRIPTION OF THE PREFERRED EMBODIMENTS

Figure 1:
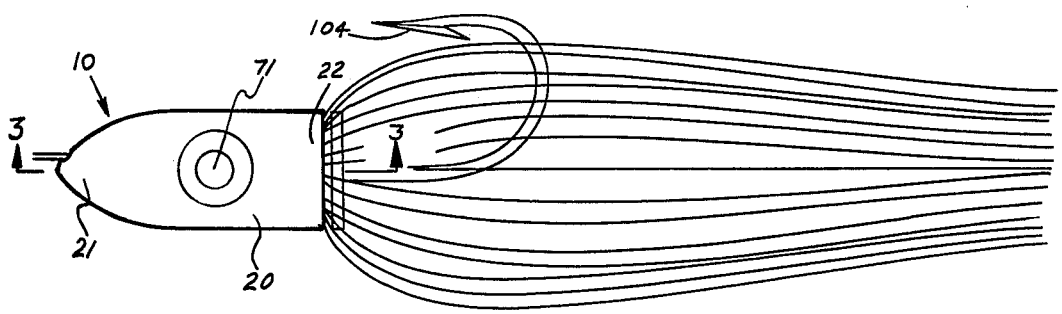
FIG. 1 is a side elevation of a first preferred embodiment in accordance with the present invention.
Figure 2:
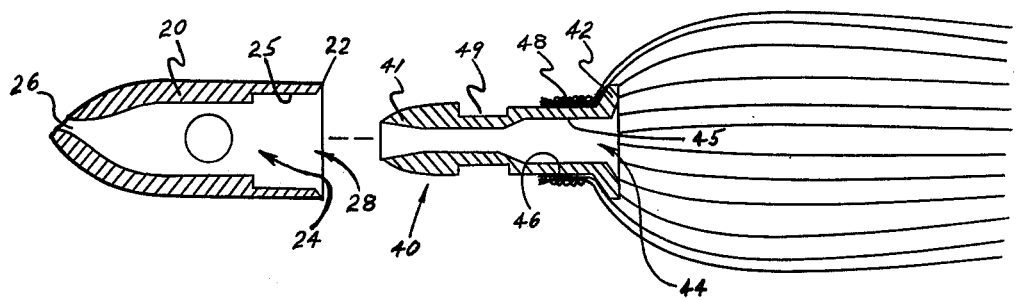
FIG. 2 is an exploded cross-sectional view taken along the central axis of the side elevation as shown in FIG. 1.
Figure 3:
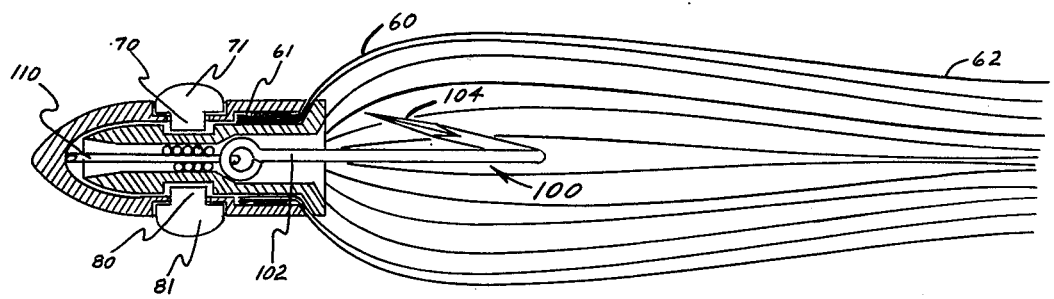
FIG. 3 is a cross-sectional view taken along section lines 3—3 of FIG. 1.

The first preferred embodiment in accordance with the present invention is shown generally as 10 in FIGS. 1, 2 and 3 of the accompanying drawings. The fishing lure 10 comprises an elongated housing 20 having a bullet or semi-conical front end 21, and a rear end 22. The housing 20 defines therein an elongated housing void 24 having the same general shape as the external surface of the housing 20. A housing bore 26 is defined adjacent the front end 21 for communicating into a front section of the housing void 24. A rear section 25 of the housing void 24 is denoted by a section of larger cross-sectional diameter. A housing aperature, shown generally as 28, is defined as the housing void 24 opens adjacent the rear end 22 of the housing.

An elongated plug, shown generally as 40, includes a front end 41 which is congruently shaped with the front end of the housing void 24 for closely coupling therewith as the elongated plug 40 is inserted into the housing void 24. A plug ring 42 is defined adjacent the rear end of the elongated plug 40 for being juxtaposed adjacent to the second end 22 of the housing 24 when the elongated plug 40 is inserted within the housing void 24. A generally cylindrical plug bore 44 is coaxially defined within the elongated plug 40. A front entrance of the plug bore 44 couples generally with the housing bore 26, whereas a rear end of the plug bore 44 includes a section of increased diameter 45 for receiving therein the shank section 102 of a fishing hook 100.

In the first preferred embodiment of the present invention as shown in FIG. 3, an elongated ornamental skirt, shown generally as 60, includes a plurality of filaments each having a first end 61 and a second end 62. The first ends 61 of the filaments 60 are compressed between the first surface of increased diameter 25 and a second circumferential surface 46 located adjacent to the plug ring 42 on the elongated plug 40. While FIG.

3 illustrates the use of bindings 48 to secure the first ends 61 of the filaments 60 to the elongated plug 40, one specific advantage of the compression fit between the juxtaposed surfaces 25 and 46 is that an adhesive substance may be used to secure the first ends 61 of the filaments 60 to the elongated plug 40 without resort to the costly process of installing the often unreliable bindings 48. The compression of the first ends 61 of the filaments between the first surface 25 and the second surface 46, as well as the compression between the plug ring 42 and the second end 22 of the housing 20, supplies additional security, in addition to the bindings 48, to firmly attach the filaments 60 to the elongated plug 40.

The circumferential diameter of the housing 20 and the plug ring 42 are determined to be smaller than the effective separation between the shank section 102 and a barb section 104 of the barbed fishing hook 100. In this manner the barb 104 will be partially hidden by the skirt elements 60, but the barb 104 will be easily accessable to hook a fish which strikes at the lure 10. Once the fish has been engaged upon the barb 104 of the fishing hook 100, the fishing lure 10 may disengage from the shank 102 by sliding along the fishing line 110 which communicates through the plug bore 44 and the housing bore 26. In this manner, the heavy ornamental portion of the fishing lure, that is the housing 20 and the elongated plug 40, will be separated from the barbed hook 100 to effectively reduce the mass of the hook 100 in order to reduce the probability of the fish disengaging the barb 104 as the fish jumps and thrashes.

In the normal operating position the shank 102 of the fishing hook 100 is recessed within the rear section 45 of the plug bore 44 for placing the barb 104 of the fishing hook 100 closer to the housing 20. The elongated plug 40 is retained within the housing void 24 by paired pins 70 and 80 which project through aperatures in the housing 20 and communicate within a circumferential slot 49 in the elongated plug 40. Enlarged ornamental eye-like elements 71 and 81 are attached to the respective pins 70 and 80 for improving the overall realism of the lure 10. The paired pins 70 and 80 are typically secured to the housing 20 by an adhesive-like substance.

Figure 4:
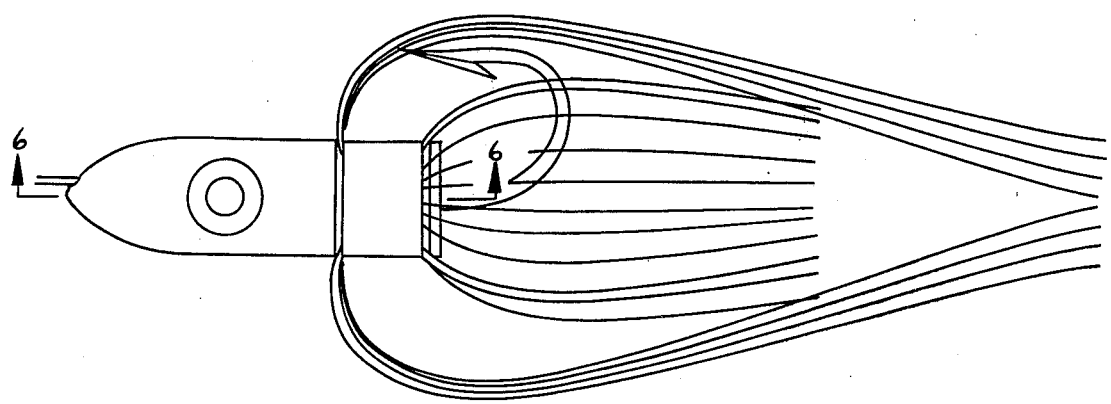
FIG. 4 is a side-elevational view of a second preferred embodiment in accordance with the present invention.
Figure 5:
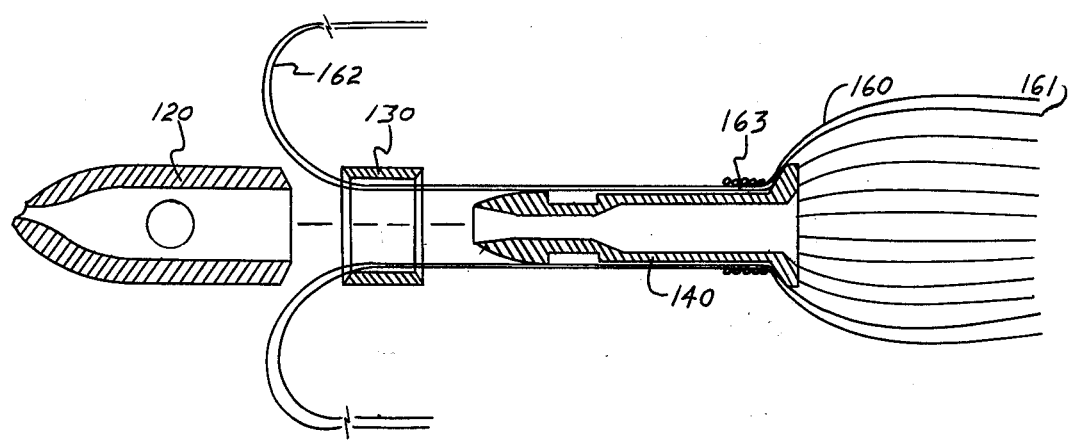
FIG. 5 is an exploded cross-section view taken along the central line of the side-elevation view shown in FIG. 4.
Figure 6:
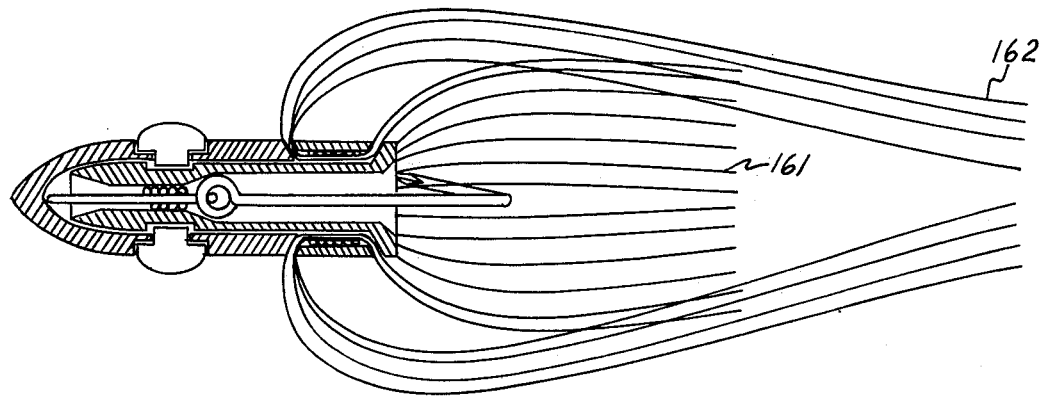
FIG. 6 is a cross-section view taken along section lines 6—6 of FIG. 4.

A second preferred embodiment in accordance with the present invention is shown generally in FIGS. 4, 5 and 6. In contrast to the first preferred embodiment, the second preferred embodiment utilizes a double skirt 160 which is formed by a plurality of filaments, each having a first end 161, a second end 162 and a mid-section 163. A skirt compression channel is defined by an inner circumferential surface of a center housing sleeve 130 and the outer circumferential surface of an elongated plug 140. In this manner the mid-section 163 of the skirt is retained by the compression action of the center housing sleeve 130 against the elongated plug 140, while the first ends 161 and the second ends 162 of the double skirt 160 are allowed to flow parallel to each other in a rearward direction as the fishing lure is drawn through the water. The oblique angle at which the section of the skirt 160 exits from between the housing 120 and the center housing sleeve 130 causes the second ends 162 of the skirt 160 to fluff-up and thereby present a more life-like and appealing appearance to the fish. The use of the center housing sleeve 130 also improves the security of the attachment of the skirt 160 to the fishing lure. While the second preferred embodiment has illustrated the center housing sleeve 130 as being a separate element, it will be apparent to one skilled in the art that the center housing sleeve 130 may be fabricated as an integral part of the housing 120 by placing circumferential apertures in the housing 120 for allowing the second ends 162 of the skirt 160 to pass therethrough in the manner shown.

Thus, a first preferred embodiment and a second preferred embodiment in accordance with the present invention have been illustrated as examples of the invention as claimed. However, the present invention should not be limited in its application to the details illustrated in the accompanying drawings of the specification, since this invention may be practiced and constructed in a variety of different embodiments. Also, it must be understood that the terminology and descriptions employed herein are used solely for the purpose of describing the general operation of the preferred embodiments and therefore should not be construed as limitations on the operability of the invention.

I claim:

1. A fishing lure of the type coupled to a fishing line and the shank section of a barbed fishing hook, said fishing lure comprising in combination:
    an elongated housing having a front end and a rear end, said housing defining therein an elongated housing void which defines a housing aperture adjacent said rear end thereof, said housing further defining a housing bore communicating through said housing from said housing void to open adjacent said front end of said housing for movably receiving therethrough the fishing line;
    a plug having a front end for removably coupling within said housing void and a rear end thereof projecting from said housing aperture, said plug having a plug bore therein communicating between said front end and said rear end thereof for movably receiving the fishing line therethrough;
    a relatively rigid sleeve for coupling with said second end of said plug so as to define a skirt channel therebetween; and
    a plurality of elongated skirt elements each having a first end, a second end and a mid-section therebetween, with said mid-sections communicating through said skirt channel so as to allow said first and second ends of said skirt elements to flow substantially parallel to each other for obscuring the barbed fishing hook as said fishing lure is pulled through the water.

2. The fishing lure as described in claim 1 wherein a rear end of said sleeve is juxtaposed with said rear end of said plug so as to operatively compress and restrain said mid-sections of said elongated skirt elements therebetween.

3. The fishing lure as described in claim 2 wherein said rear end of said plug includes a section of increased diameter for being juxtaposed with said rear end of said sleeve so as to compress and restrain said mid-sections of said elongated skirt elements therebetween.

4. The fishing lure as described in claim 2 wherein a front end of said sleeve is juxtaposed with said rear end of said housing so as to operatively compress and restrain said mid-sections of said elongated skirt elements therebetween.

5. The fishing lure as described in claim 1 further including:
    a coupling aperture communicating through said housing and opening into said housing void therewithin; and
    a pin for communicating through said coupling aperture and coupling with said plug therewithin, thereby operably securing said plug to said housing.

6. The fishing lure as described in claim 5 wherein said pin includes adjacent a distended end thereof an ornamental head of increased diameter.

7. The fishing lure as described in claim 6 wherein said ornamental head comprises an eye of said fishing lure.

8. The fishing lure as described in claim 1 wherein said plug bore is of sufficient diameter so as to removably receive therewithin the shank section of the barbed fishing hook.

9. A fishing lure of the type coupled to a fishing line and the shank section of a barbed fishing hook, said fishing lure comprising in combination:

an elongated housing having a front end and a rear end, said housing defining therein an elongated housing void which defines a housing aperture adjacent said rear end of said housing, said housing further defining a housing bore communicating through said housing from said housing void to open adjacent said front end of said housing for removably receiving therethrough the fishing line, with said housing also defining therein a coupling aperture which opens into said housing void;

an elongated plug having a front end for removably coupling within said housing void and a rear end thereof projecting from said housing aperture, said plug having a plug bore communicating between said front end and said rear end thereof for movably receiving the fishing line therethrough, with said plug having adjacent a rear end thereof a head section of increased cross-sectional area juxtaposed with said rear end of said housing for defining a skirt channel therebetween;

a plurality of elongated ornamental skirt elements each having a section thereof communicating through said skirt channel; and pin means having an ornamental head attached to a shank which communicates through said coupling aperture for coupling with said plug so as to compress and operatively restrain said skirt elements within said skirt channel defined between said rear end of said housing and said head section of said plug.

10. The fishing lure as described in claim 9 wherein said ornamental head comprises an eye of said fishing lure.

11. The fishing lure as described in claim 8 further including:

a circumferential sleeve juxtaposed within said skirt channel for being compressed between said head section of said plug and said rear end of said housing; and wherein each of said elongated skirt elements comprises a first end, a second end, and a mid-section therebetween, with said mid-section communicating through said skirt channel between said circumferential sleeve and said plug for being compressed and restrained therebetween.

* * * * *